No. 754,943. PATENTED MAR. 15, 1904.
T. R. TIMBY.
METHOD OF ROASTING COFFEE.
APPLICATION FILED FEB. 14, 1901.
NO MODEL. 2 SHEETS—SHEET 1.

Witnesses
Chas. K. Davies
Paul B. McFarland

Inventor
T. R. Timby
By W. H. Bartlett
Attorney

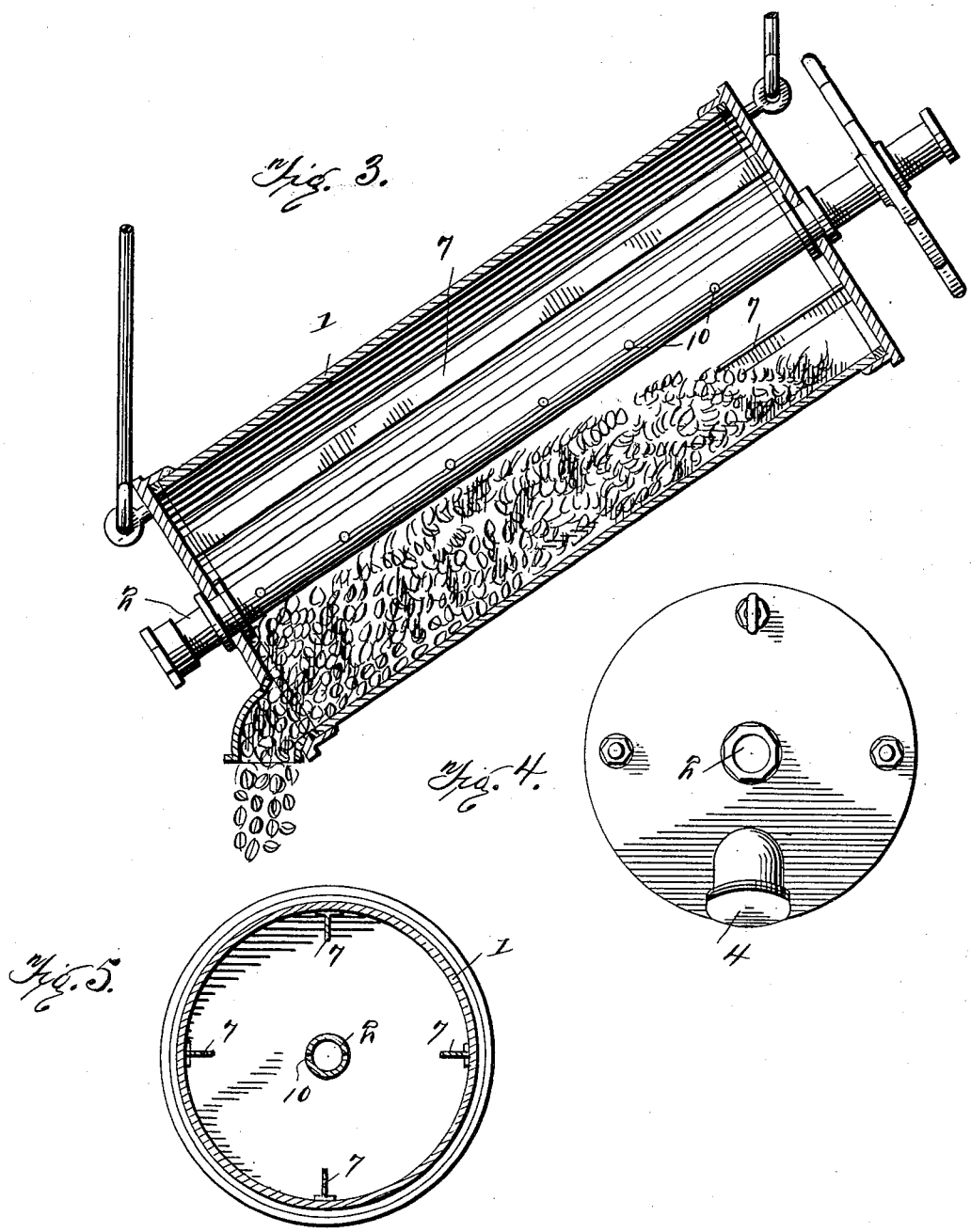

No. 754,943.                                                           Patented March 15, 1904.

UNITED STATES PATENT OFFICE.

THEODORE R. TIMBY, OF BROOKLYN, NEW YORK.

METHOD OF ROASTING COFFEE.

SPECIFICATION forming part of Letters Patent No. 754,943, dated March 15, 1904.

Application filed February 14, 1901. Serial No. 47,301. (No model.)

*To all whom it may concern:*

Be it known that I, THEODORE R. TIMBY, residing at Brooklyn, in the county of Kings and State of New York, have invented certain new and useful Improvements in Methods of Roasting Coffee, of which the following is a specification, reference being had therein to the accompanying drawings.

This invention relates to a method of roasting or browning coffee.

The object of the invention is to roast or brown coffee without loss of weight, so far as may be, while preserving the flavor or aroma.

Figure 1:
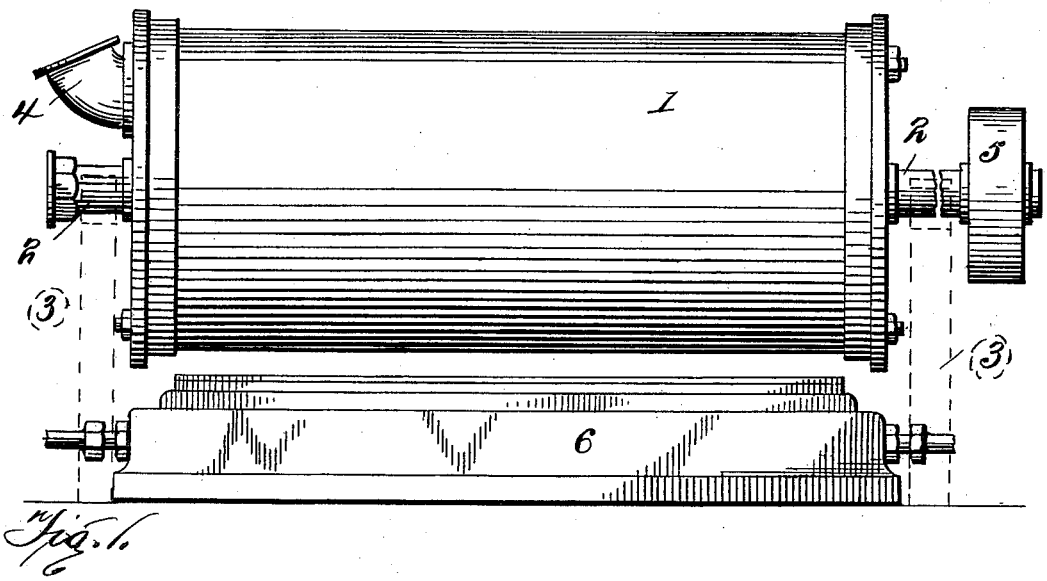
Figure 2:
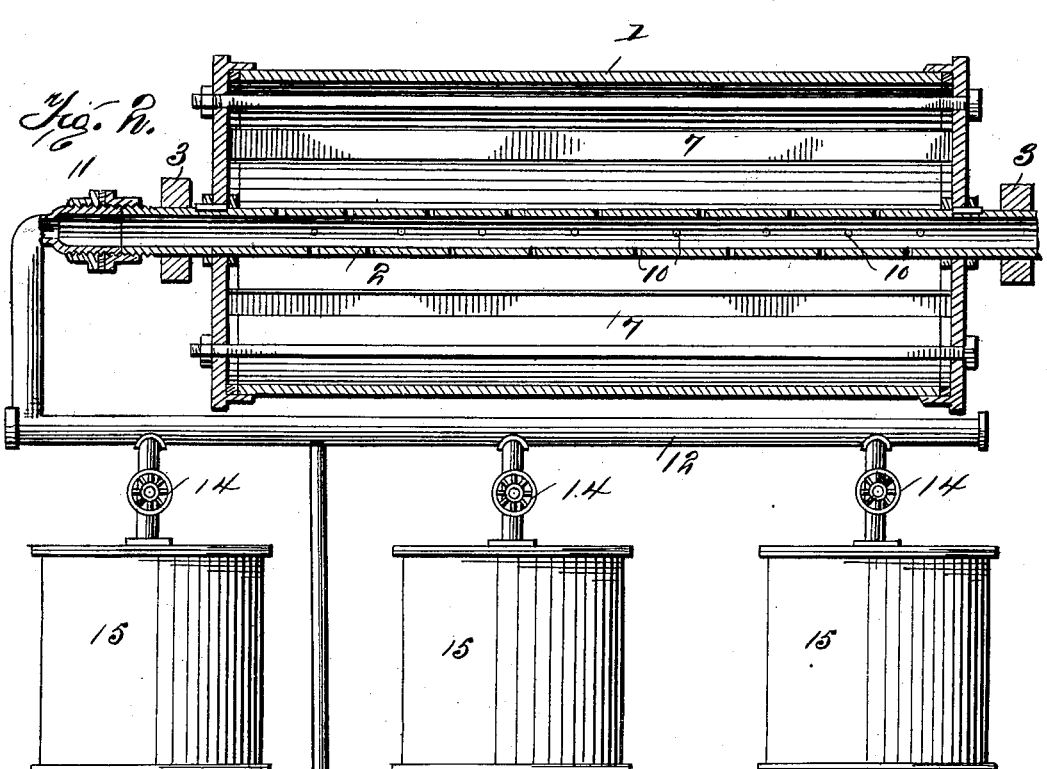

Figure 1 is an elevation of a coffee-roasting drum and heater adapted for the carrying out of my process. Fig. 2 is a plan, partly in section, showing a roasting-drum and compression-reservoirs and pump. Fig. 3 is a broken longitudinal section of the roasting-cylinder lifted from its bearings, as in the act of emptying. Fig. 4 is an end view of the roasting-cylinder, and Fig. 5 is a vertical section of the roasting-cylinder.

The numeral 1 indicates a strong drum, mounted on a shaft 2, supported by suitable bearings, as 3, and provided with an inlet-opening or manhole 4, and with means, as 5, for causing the drum to be rotated. The furnace 6 may be a gas-burner or any other means for bringing heat to bear against the drum. The drum can be tightly closed and sealed and is then capable of withstanding a large internal pressure. I illustrate this particular form of roasting-drum as probably the best with which I am now acquainted. Other forms might be used.

In carrying out my method I inclose a quantity of coffee-beans in the drum and hermetically seal the drum. Then the fire is lighted under the drum or the drum otherwise heated, and the drum is slowly rotated, so as to keep the coffee-beans agitated and prevent them from burning to the side of the cylinder or from browning unequally. By preference there should be stirring-arms, as 7, within the drum, so as to act as scrapers or mixers for the coffee. The temperature within the drum may be carried to some 400° or to the heat necessary to secure a thorough roast of the coffee-beans, and the roasting may be continued as long as may be necessary. When pressure is formed in the drum by the expansion of air and gases and by the expansion of the coffee-beans, an outlet is permitted for the excess of pressure, as follows: The shaft 2 is hollow and has perforations inside the drum. Shaft 2 is connected by a suitable pipe, as 11, with the pipe 12, which in turn communicates through suitable valves and by passages with the strong reservoirs 15, the valves 14 serving to close the passages between these reservoirs 15 and the pipe 12, which leads to drum 1. When it is desired to relieve the pressure in drum 1, one of the valves 14 is opened, and the aromatic vapor from the coffee produced by the heating or roasting then enters said reservoir 15, being thus withdrawn from drum 1. Preferably, however, the full pressure developed during the roasting is allowed to remain on the coffee-beans until the same are roasted to such degree as experience shows is best adapted for the particular grade of coffee under treatment. Then the heat is permitted to fall away until the coffee is quite cool. There may still be a pressure in drum 1, and the gas will then be led off into one of the reservoirs 15 and there penned and stored. The cooling of the drum may be effected by the removal of the fire from the drum or the drum from the fire, as desirable, and any known means may be used to hasten the cooling. After coffee-beans are roasted in the drum they may be further treated to pressure by opening one or more of the valves 14, thus permitting the entrance of air or gases stored under pressure in reservoir 15 to flow into drum 1 and restore to the beans any of the lost aroma due to the roasting.

Coffee as usually roasted in an open vessel loses from fifteen to twenty per cent. in weight. By my process there is little or no loss of weight, as whatever is driven out of the beans in roasting is restored by the pressure of air and aromatic gases in the process of cooling.

In some instances it is desirable to partially exhaust the air from drum 1 before beginning the roasting. In such case the pump 17 (indicated in dotted lines) may be employed to make a partial vacuum in the drum. The same or another pump can be used in reverse direction to put an air-pressure on the material inclosed in the drum.

The number of reservoirs 15 and the manner of making the mechanical connections to the drum may be varied according to convenience.

For facility in filling and emptying the drum 1 the same may be swung to any desired position, as in Fig. 3, and may be filled and emptied by gravity or by suitable feeders.

I do not herein claim any of the mechanism shown, described, or referred to. It is obvious that other mechanism than a pump may be used to cause a partial vacuum or to apply a gaseous pressure. The reduction of temperature in a receptacle where air or gas has been expanded and allowed in part to escape will cause a partial vacuum. The falling of a column of water or mercury in a closed vessel will produce a partial vacuum. The mechanism I have illustrated forms no part of the invention claimed by me, but is given merely to show a mechanism which may be employed to carry out my process. Any other mechanism whatever which will produce a like result may be employed by me without departing from the present invention.

What I claim is—

1. The method of roasting coffee which consists in inclosing coffee-beans in a strong receptacle, heating the same, withdrawing air and gases from the receptacle, cooling the coffee, and restoring thereto gases withdrawn from coffee.

2. The method of roasting coffee which consists in inclosing coffee-beans in a strong vessel, creating a partial vacuum in the vessel, heating the beans to a roasting temperature and storing the gases driven off from the coffee by heat, and afterward restoring such gases to coffee-beans under pressure.

3. The step in the art of roasting coffee which consists in partially withdrawing air therefrom, then developing gases from the beans by heat applied at a roasting temperature, storing the gases so developed, and restoring them to the beans under pressure.

In testimony whereof I affix my signature in presence of two witnesses.

T. R. TIMBY.

Witnesses:
  W. A. BARTLETT,
  ALFRED B. DENT.